(12) United States Patent
Huang

(10) Patent No.: US 11,502,779 B2
(45) Date of Patent: Nov. 15, 2022

(54) CNN-BASED DEMODULATING AND DECODING SYSTEMS AND METHODS FOR UNIVERSAL RECEIVER

(71) Applicant: Maxim Integrated Products, Inc., San Jose, CA (US)

(72) Inventor: Haiyu Huang, Dallas, TX (US)

(73) Assignee: Analog Devices, Inc., San Jose, CA (US)

( * ) Notice: Subject to any disclaimer, the term of this patent is extended or adjusted under 35 U.S.C. 154(b) by 112 days.

(21) Appl. No.: 16/934,676

(22) Filed: Jul. 21, 2020

(65) Prior Publication Data

US 2021/0028885 A1    Jan. 28, 2021

Related U.S. Application Data

(60) Provisional application No. 62/879,330, filed on Jul. 26, 2019.

(51) Int. Cl.
| | | |
|---|---|---|
| *H04L 1/00* | (2006.01) | |
| *G06N 3/08* | (2006.01) | |
| *G06F 9/50* | (2006.01) | |
| *G06N 5/04* | (2006.01) | |
| *G06N 20/10* | (2019.01) | |
| *G06N 3/04* | (2006.01) | |

(52) U.S. Cl.
CPC .......... *H04L 1/0045* (2013.01); *G06F 9/5027* (2013.01); *G06N 3/0481* (2013.01); *G06N 3/08* (2013.01); *G06N 5/046* (2013.01); *G06N 20/10* (2019.01)

(58) Field of Classification Search
CPC ........ H04L 1/0045; G06N 3/08; G06N 5/046; G06N 3/0481; G06F 9/5027

USPC ......................................................... 375/316
See application file for complete search history.

(56) References Cited

U.S. PATENT DOCUMENTS

| | | | |
|---|---|---|---|
| 11,200,487 B1 * | 12/2021 | Grundmann | .............. G02F 1/35 |
| 2008/0144628 A1 | 6/2008 | Tsai et al. | |
| 2016/0204876 A1 | 7/2016 | Kamura et al. | |
| 2016/0380792 A1 | 12/2016 | Colavolpe et al. | |
| 2019/0274108 A1 | 9/2019 | O'Shea et al. | |

(Continued)

OTHER PUBLICATIONS

Validity Search Report dated Apr. 24, 2020 for Maxm-2074P, Bishop Rock, LLC, (20 pgs).

(Continued)

*Primary Examiner* — Emmanuel Bayard
(74) *Attorney, Agent, or Firm* — North Weber & Baugh LLP; Michael North

(57) ABSTRACT

Presented are systems and methods for automatically decoding and demodulating radio signals in a communication network. Embodiments utilize a one-dimensional (1D) convolutional neural network (CNN) as the key architecture of a decoder that utilizes one or more 1D convolution windows to perform convolution operations on to-be-decoded or demodulated input signals received by the communication network. In embodiments, this may be achieved by receiving, at a CNN correlator implemented in a decoder, an input signal that comprises unknown data and applying to the input signal, in the discrete time domain, a convolution to obtain a CNN correlator output to which an activation may be applied to decode the input signal and output the decoded signal.

20 Claims, 17 Drawing Sheets

(56) References Cited

U.S. PATENT DOCUMENTS

| | | | |
|---|---|---|---|
| 2019/0288878 A1* | 9/2019 | Shen | H04L 25/0224 |
| 2019/0319658 A1 | 10/2019 | Calabro et al. | |
| 2019/0327463 A1 | 10/2019 | Zhao et al. | |
| 2019/0349228 A1 | 11/2019 | Olsen et al. | |
| 2020/0012895 A1* | 1/2020 | Zhao | G16H 50/70 |
| 2020/0143240 A1* | 5/2020 | Baker | G06N 3/04 |
| 2021/0081754 A1* | 3/2021 | Frolova | G06V 10/82 |

OTHER PUBLICATIONS

Infringement Report dated Apr. 24, 2020 for Maxm-2074P, Bishop Rock, LLC, (18 pgs).

Artificial Intelligence Radio Transceiver (AIR-T), dated Jan. 2017, Analog Devices, available from the Internet, <URL:https://deepwavedigital.com/sdr>, (6 pgs).

LimeSDR Software Defined Radio, dated Jan. 2017, available from the Internet, <URL:https://limemicro.com/products/boards/limesdr>, (15 pgs).

Non-Final office action dated Feb. 16, 2022 in related U.S. Appl. No. 16/994,811, (17 pgs).

Non-Final office action response filed May 2, 2022 in related U.S. Appl. No. 16/994,811, (7 pgs).

Notice of Allowance dated Jul. 27, 2022 in related U.S. Appl. No. 16/994,811, (13 pgs).

\* cited by examiner

500

CARD DISTANCE = 4 cm

CNN-BASED DEMODULATING AND DECODING SYSTEMS AND METHODS FOR UNIVERSAL RECEIVER

CROSS-REFERENCE TO RELATED APPLICATION

This patent application is related to and claims priority benefit under 35 USC § 119(e) to commonly-owned U.S. Pat. App. No. 62/879,330 filed on Jul. 26, 2019, entitled "CNN-Based Demodulating and Decoding Systems and Methods for Universal Receiver," listing Haiyu Huang as inventor, which patent document is incorporated by reference herein in its entirety and for all purposes.

BACKGROUND

The present disclosure relates generally to wireless communication systems and machine learning. More particularly, the present disclosure relates to signal processing for trainable universal radio, software defined radio, and smart radio.

In electrical communication systems that follow optimal receiver theory, a known input signal such as a modulated carrier signal can be better detected by a receiver that matches the received signal. A correlator, for example, may produce a matched filter by multiplying a received digitized waveform with a reference waveform and then digitally integrate the product. The optimal receiver that observes the input signal and random noise generated by various interference sources, algebraically adds (or multiplies) the two quantities to maximize the probability density (a sum of partial quantities) of the received input signal with respect to an attempted sequence. The noise is typically white Gaussian noise, which has a probability density that lends itself to conveniently carrying out calculations.

To conform to the increasing number of protocols and modulation schemes, a decoder circuit in the receiver carries out convolutional decoding by using a number of fixed, predefined correlators when cross-correlating the received modulated signal with the reference waveform. Common receivers need to utilize separate, dedicated decoders that have predefined settings for each protocol and, oftentimes, for each modulation scheme. As a result, hardware cost, incompatibility issues, and complexity significantly increase with the increasing number of protocols and modulation schemes that need to be supported. For example, for radio communication, NFC has Type A, B, Felica®, MIFARE®, Vicinity, etc. Bluetooth also has several varieties; especially, the more customized modulation/encoding schedules, such as "ANT+," "Byrd," and "Anthena" by Gatekeeper, indicating a trend toward further diversification instead of conversion to a common standard. In fact, even within a single standard, such as Wi-Fi™, different scenarios may require different decoder hardware settings or manual intervention.

To accommodate the increasing number of different protocols and modulation schemes for different radio technologies, in an attempt to address the shortcomings of existing communication systems, one existing approach involves the concept of software defined radio by moving some communication components, including the decoder, from a traditional hardware implementation to a software implementation on a computer or embedded system. However, software defined radio is known to require fast and power-hungry processors, such as general-purpose CPUs for performing signal processing and decoding tasks, rendering this approach impractical for most communication applications.

Accordingly, it would be desirable to have improved, low-cost decoding systems and methods that are suitable for different protocols and modulation schemes, operate on low-power, and shorten design cycles.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments.

DETAILED DESCRIPTION OF THE PREFERRED EMBODIMENTS

Figure 1:
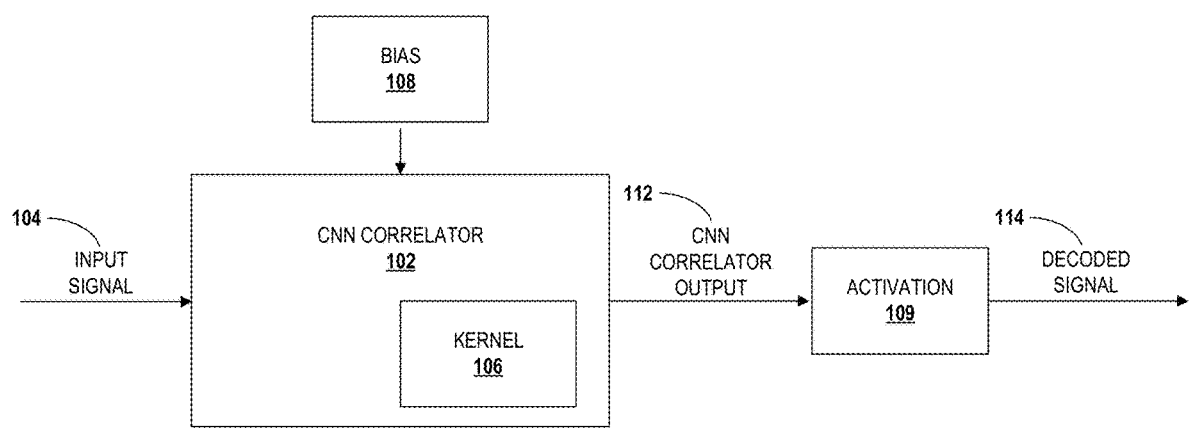
FIG. 1 illustrates a one-dimensional (1D) convolutional neural network (CNN)-based demodulator/decoder system for demodulating/decoding according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

It shall be noted that: (1) certain steps may optionally be performed; (2) steps may not be limited to the specific order set forth herein; (3) certain steps may be performed in different orders; and (4) certain steps may be done concurrently.

It shall also be noted that although embodiments described herein may be within the context of one-dimensional (1D) and two-dimensional (2D) CNNs, aspects of the present disclosure are not so limited. Accordingly, the aspects of the present disclosure may be applied or adapted for use in demodulating and decoding with multi-dimensional CNNs and other machine learning application.

Any headings used herein are for organizational purposes only and shall not be used to limit the scope of the description or the claims. Each reference/document mentioned in this patent document is incorporated by reference herein in its entirety.

General Introduction

Various embodiments herein leverage machine learning—a subfield of artificial intelligence that enables computers to learn on their own without being explicitly programmed—to automatically decode and demodulate signals in a communication network.

Generally, machine learning architectures process neural network layers in an artificial neural network by using, e.g., a CNN. A CNN is a type of supervised network that allows solving complex classification or regression problems, such as performing image recognition tasks, which has led to their continually increased popularity. A CNN's convolution operations are computationally intensive and typically performed by CPU and GPU architectures not specifically designed or optimized to perform such operations efficiently. While recent high-computational-throughput processors with improved architectures have increased computing speed, no effort has been made in utilizing machine learning approaches for demodulator and decoder applications or in creating processors that are optimized for CNN architectures for implementation into communication systems.

Unlike conventional optimal receiver theory, which uses a number of fixed, predefined correlators that correlate a received signal against reference data, embodiments presented herein utilize, e.g., a 1D CNN as the key architecture of a decoder that utilizes one or more 1D convolution windows (or kernels) to perform convolution operations on a to-be-decoded or demodulated input signal that has been received.

In embodiments, a CNN that comprises any number of layers and sub-layers may be implemented by electrical circuits that perform multiply-and-accumulate operations. The convolutional layers may compute a number of filters. As discussed in greater detail below, each filter may represent a feature that is common with labeled data in an input training data set. The CNN may then, in a subsequent inference phase, apply the so learned filters to new, unknown input signals in order to discern different features, such as zeroes and ones, by convolving the filter over the input signal according to embodiments of the present disclosure.

FIG. 1 illustrates a CNN-based decoder demodulator/decoder system for demodulating/decoding according to embodiments of the present disclosure. It is pointed out that system 100 is used only for demonstration purposes and ease of illustration. As depicted in FIG. 1, demodulator/decoder 100 comprises CNN correlator 102 that in response to receiving/detecting input signal 104, uses input signal 104 and convolution kernel 106 (or weights) to perform a number of convolutions. Input signal 104 received at CNN demodulator/decoder 100 may be a to-be-decoded modulated RF signal that comprises data that was unknown to CNN correlator 102 (i.e., for purposes of machine learning, unlabeled data) and may comprise any number of channels. Since commonly, two signals (channels I and Q) exist in a mixer down-conversion based radio communication receiver, in embodiments, in order to match the input signal, kernel 106 may have same number of channels as input signal 104. It is understood that the number of channels may be different from the number of CNN filters or kernels 106 used.

In embodiments, CNN correlator 102 may be implemented as a digital device that detects within input signal 104 the presence of replica of a pattern, such as a discrete time domain sequence of finite-length. In embodiments, CNN correlator 102 determines the amount of correlation between corresponding bits in input signal 104 and kernel 106. Whenever input signal 104 and kernel 106 perfectly correspond to each other, the correlation is deemed maximal, thus, resulting in a maximal CNN correlator output 112. A partial correlation will result in a less than maximal correlator output 112, and a mathematical anti-correlation may result in a negative correlator output 112.

Kernel 106 may be implemented in a dedicated low-power neural processor or accelerator that, in embodiments, may be programmable. The decoding of input signal 104 may be implemented in hardware as neural processor.

In embodiments, CNN correlator 102 may use 1D convolution operations to generate output feature sequences for a given neural layer by using data in a 1D convolution window from a previous layer. In embodiments, each feature point in the output feature sequence may be the weighted sum of the input data with all input channels that may be passed through a nonlinear activation function.

In embodiments, prior to applying activation 109 (e.g., a non-linear activation function) to generate decoded signal 114, trainable bias 108 may be added to the weighted sum to generate CNN correlator output 112. The convolution window may be moved by a given stride to produce the next feature point reapplying (i.e., reusing the same calculation circuits) the same weights to the next convolution window, thus, taking advantage of weight-sharing with convolution neural networks, unlike a fully connected neural network.

It is understood that proper amount of padding may be applied to the input data, and proper CNN hyperparameters, such as filter size, stride, and number of convolution layers may be used as a deep CNN to generate output data with desired sequence size, which is typically the number of desired received data in a communication frame.

In embodiments, CNN correlator 102 may use 2D convolution operations to generate output feature maps for a given layer by using data in a 2D window from a previous layer. In embodiments, each feature point in the output feature map may be the weighted sum of the input data that may be passed through a nonlinear activation function unit 109 and a trainable bias may be added to the weighted sum prior to applying an activation function.

In embodiments, activation 109 may utilize hardware accelerators (not shown) to obtain output signal 114. In embodiments, activation 109 may operate in the analog domain and may use a relatively simple activation function, such as ReLU.

Similarly, bias 108 may be utilized, for example, as an offset to input signal 104, a digital offset, a digital adder to CNN output 112, an offset inside activation 109, or a separate weight item, e.g., with a corresponding fixed data item representing the value 1.

In embodiments, the convolution window may then be moved by a given stride to produce the next feature point reapplying the same weights to the next convolution window, again, to take advantage of weight-sharing.

In embodiments, the input signal, which in communication applications is typically 1D data sequence, may be converted into a 2D, image-like signal suitable for being processed by a 2D CNN. It is understood that, as with 1D embodiments, the proper amount of padding may be applied to input data, and CNN hyperparameters may be used as a deep CNN to generate output data with desired sequence size.

In embodiments, filter results from a convolutional layer may be summed and output into a subsequent pooling layer that may perform subsampling operations, e.g., to reduce output map dimensions of the preceding convolutional layer.

It is understood that convolutional layer operations and pooling layer operations may be applied any number of times and in any order (e.g., a pooling layer may be applied before a convolution layer), until a predefined stop condition has been reached. This may be followed by a fully connected layer that may be used to perform pattern detection. Finally, the CNN correlator output of the overall multi-layer neural network may be tested, e.g., in real-time operation to determine whether a zero or one has been successfully recognized, such as to gain insight to information contained in a communication frame of the communication signal, and the like. In embodiments, as a last-step decoding process, data values from the last CNN layer may be collected, e.g., by software, and used directly or the data values may serve as input for a classification function, such as zeroes or ones in activation 109 that are then output as output signal 114.

In embodiments, convolve kernels of a 1D or multi-dimensional CNN may utilize labeled training sequence of receiver signals as input to learn zeroes and ones. In embodiments, the weights of a convolve window may be trained in batch, or in real-time in an on-line training fashion, e.g., where a customer feeds real-time testing signals through the internet. It is noted that the trained network may then be fine-tuned, e.g., iteratively, to learn additional features. In effect, this self-optimizes the convolve kernels to automatically decode the received communication signals in real-time.

In embodiments, training of CNN 102 may be implemented in software, e.g., by using a more powerful processor than for inference. To train decoder system 100, labeled decoding results may be used as inputs 104 for CNN 102. It is understood that, in embodiments, training may begin with a default (e.g., random or pseudorandom) kernel that may be modified over time. In embodiments, supervised learning may be employed, e.g., to distinguish different symbol patterns, e.g., zeroes and ones.

For example, for protocols that comprise a known sequence of symbols, e.g., a fixed 8-byte preamble that comprises 0s and 1s, some or all of such sequence may be utilized as a training set. It is understood that, in embodiments, the length of a suitable preamble that may serve as a predetermined labeled training set, ideally, is not too short to be useful for training purposes. The training preamble, as well as neural network hyperparameters, e.g., stride, may be determined by various factors, such as sample rate or data rate, type of neural network, and the like.

It is envisioned that new protocols may be developed or existing ones modified to enable such training on a preamble, e.g., in a dedicated training mode before actual data communication commences in a regular mode. In embodiments, trainability advantageously eliminates the need to separately define and implement kernels for each individual modulation scheme and scenario.

Once training (learning) is completed, in an inference (prediction) phase, CNN correlator 102 may use unsupervised operations to detect or interpolate previously unseen sequences in new input data, e.g., to demodulate and decode the sequence into zeroes and ones, or other forms of desired information, in real-time.

Unlike conventional demodulators or decoders, the approach of retraining CNN-based demodulator/decoder 100 to adapt to changing scenarios and communication protocols without having to design new generation hardware products significantly reduces design time and cost for future communication technologies and facilitates easy upgrades.

It is understood that system 100 and its components illustrated in FIG. 1 are not limited to the constructional detail shown there or described in the accompanying text. For example, as those skilled in the art will appreciate, CNN correlator 102 may be implemented many different ways and comprise any number of hidden network layers. Similarly, activation unit 109 may utilize a wide variety of activation functions circuits, such as Leaky ReLU and sigmoid.

Figure 2A:
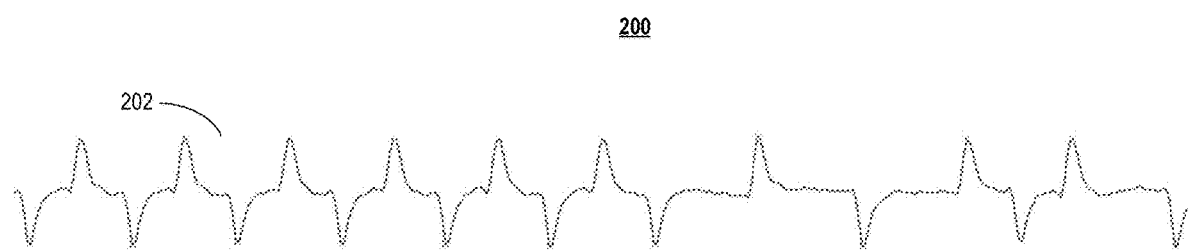
FIG. 2A illustrates an exemplary receiver input signal in the time-domain.

FIG. 2A illustrates an exemplary receiver input signal in the time-domain. In optimal receiver theory, $$r(t)=\int_0^t f(\tau)s(\tau)d\tau \quad \text{(Eq. 1)}$$

in the time domain, where r(t) is the output signal at time t; and s(τ) and f(τ) are input signal 202 (e.g., a to-be-decoded modulated signal that contains noise, distortion, and interference from wireless communication) and the correlator, respectively, at time τ. Conventionally, correlator $f$ is a fixed predesigned function that is typically hardcoded in a digital demodulator that requires a different $f$ for each different type of signal, e.g., a Bluetooth LE signal.

In contrast, in embodiments, a convolution step in a 1D CNN uses:

$$r(kT_s) = \Sigma_{n=k-p}^{k} W(nT_s) s(nT_s) \quad \text{(Eq. 2)}$$

in the discrete time domain, where $r(kT_s)$ represents the output signal at discrete time $kT_s$; $s(nT_s)$ and $W(nT_s)$ represent the respective input signal 202 and weight function 252, i.e., the convolve window of the CNN (kernel), at time $nT_s$; and p represents the number of samples that each symbol period contains.

In embodiments, a convolution layer in the 1D CNN uses:

$$a_j(kT_s) = act(\Sigma_{i=1}^{c} \Sigma_{n=k-p}^{k} W_i(nT_s) s_i(nT_s) + b) \quad \text{(Eq. 3)}$$

where $a_j$ is the output of filter j (j=1, 2, 3 . . . 1), where l represents the number of filters in that layer), c represents the number of channels of the input signal, b is the bias, and act represents a nonlinear activation function.

It is noted that unlike the correlator in Eq. 1, kernel $W(nT_s)$ is not a fixed function. It is further noted that, in embodiments, receiver input signal 202 may be a down-converted signal, such as the output of an analog mixer that mixes a modulated carrier signal to a lower frequency. A signal of interest may then be detected in the lower frequency signal, or demodulated digital waveform, by correlating it, e.g., with an appropriately trained kernel.

In embodiments, 1D input signal 202 may be an input string of data that, e.g., in an intermediate step, may be folded into a 2D (e.g., square) input signal (not shown in FIG. 2A), which is commonly used for image processing, or an even larger 3D CNN, such that 1D input string of data may be processed through a 2D or 3D CNN kernel to be decoded. In embodiments, this may be accomplished by reconstructing 1D input signal 202 in a manner such as to fit the size and shape of the multi-dimensional CNN kernel.

It is understood that the concept of "folding" may be equally applied to any N-dimensional input and neural network.

Figure 2B:
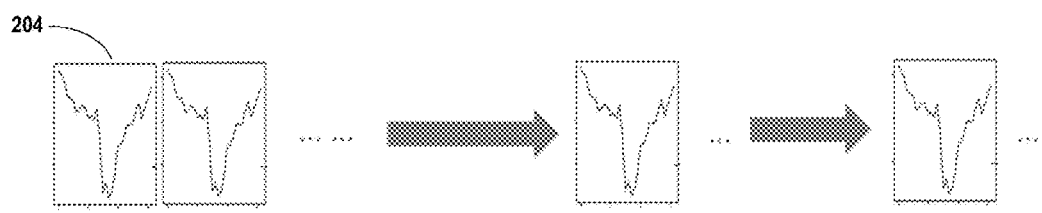
FIG. 2B illustrates the application of an exemplary correlator to the receiver input signal in FIG. 2A.

FIG. 2B illustrates the application of an exemplary correlator to the receiver input signal in FIG. 2A. It is noted that FIG. 2A and FIG. 2B are shown for illustrative purposes to visualize and increase understanding of the presented concepts. Although a time-domain input signal is shown in FIG. 2A, it is understood that correlator 102 may be implemented to correlate, process, and compare other types of signals.

Signal $s(\tau)$ 202 in FIG. 2A represents an input waveform as it may be received by a receiver. The waveforms 204 in FIG. 2B represent a correlator or kernel for the CNN. In embodiments, a correlator comprising a 1D CNN convolves the two waveforms that are to be correlated, e.g., using a stride (i.e., interval or step size that kernel 106 moves per output computation) and window size both equal to the number of samples in a period p. In embodiments, the convolution window identifies characteristics, here zeroes and ones, at various locations in input signal 202. The correlator may output a convolution result that represents how closely input kernel 106 matches signal 104, a large output indicating a high degree of correlation, a small sum indicating a low degree of correlation, and, in the case of the input being maximally unmatched, even negative correlation (anti-correlation).

In embodiments, input signal 202 comprises one or more channels that match the number of channels in a CNN filter, and one or more filters may share the same set of kernels 204, reusing kernel 204, to increase utilization of computational resources, such as storage space and computation time.

Figure 3:
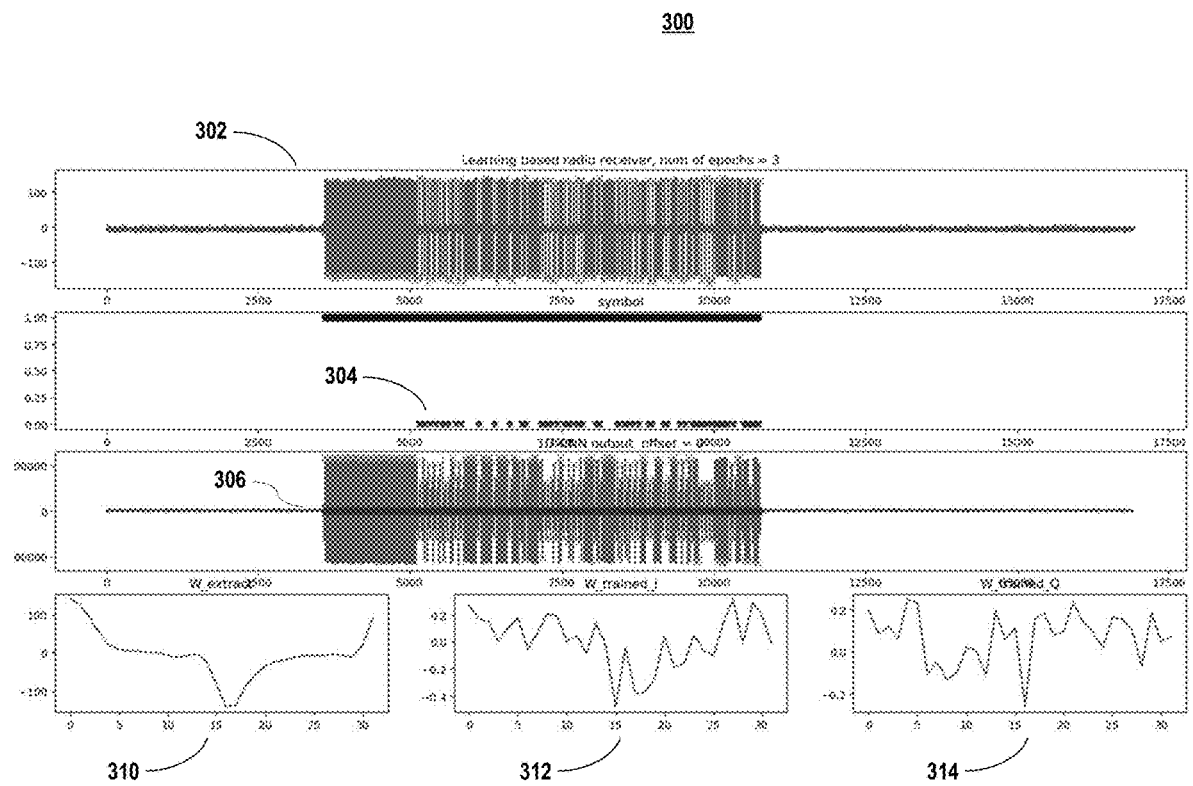
FIG. 3 illustrates the effect of training CNN kernels to decode a received signal that follows a certain protocol, according to embodiments of the present disclosure.

FIG. 3 shows simulation results that illustrate the effect of training CNN kernels to decode a received signal that comprises two channels, I (shown as 302) and Q (not shown). It is noted that all examples, values, and results herein are provided by way of illustration and were performed under specific conditions using a specific embodiment or embodiments. Accordingly, neither these experiments nor their results shall be used to limit the scope of the disclosure of the current patent document.

The received signal 302 in FIG. 3 follows a certain protocol according to embodiments of the present disclosure. In this example, exemplary CNN kernel channels 312, 314 are optimized for decoding an NFC signal of the Felica® protocol. In embodiments, CNN kernel channels 312, 314 are automatically constructed and "self-optimized" after having been trained for, example with real analog-to-digital convertor data samples obtained by an NFC receiver from communicating with actual Felica® cards.

The CNN kernels depicted in FIG. 3, have undergone 3 epochs of training.

In embodiments, training may involve a supervised training process that may be executed on a different, powerful processor that may use a gradient decent process based on cost-function minimization. As indicated by the triangles in signal 304 in FIG. 3, resulting signal 304 still contains relatively many decoding errors after the 3-epoch training.

Figure 4:
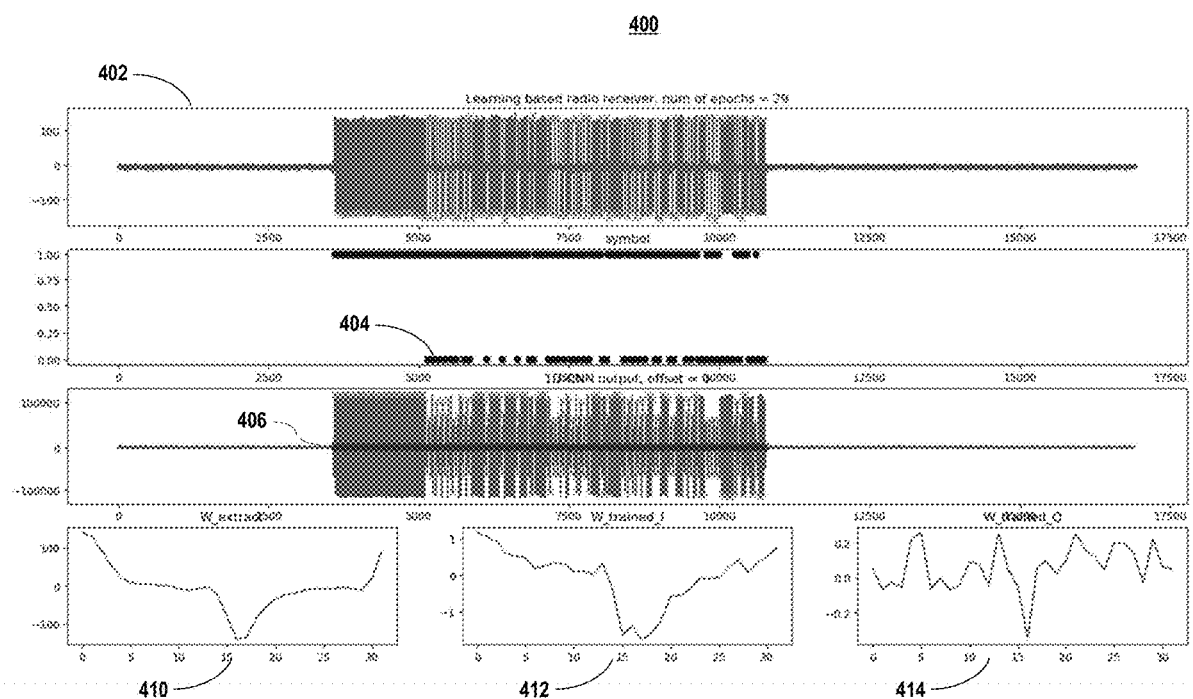
FIG. 4 illustrates the effect of additional training on the CNN kernels used in FIG. 2.

FIG. 4 illustrates the effect of additional training on the exemplary CNN kernels used in FIG. 3. The CNN kernels depicted in FIG. 4, have undergone 29 epochs of training. As shown, resulting signal 404 no longer contains decoding errors, and the better trained CNN kernel 414, 416 closer resembles to optimal kernel 410.

Advantageously, systems according to embodiments of the present disclosure that utilize a dynamically trainable kernel, which may be re-trained and upgraded to accommodate different scenarios, greatly saves design time, including simulation time.

Figure 5A:
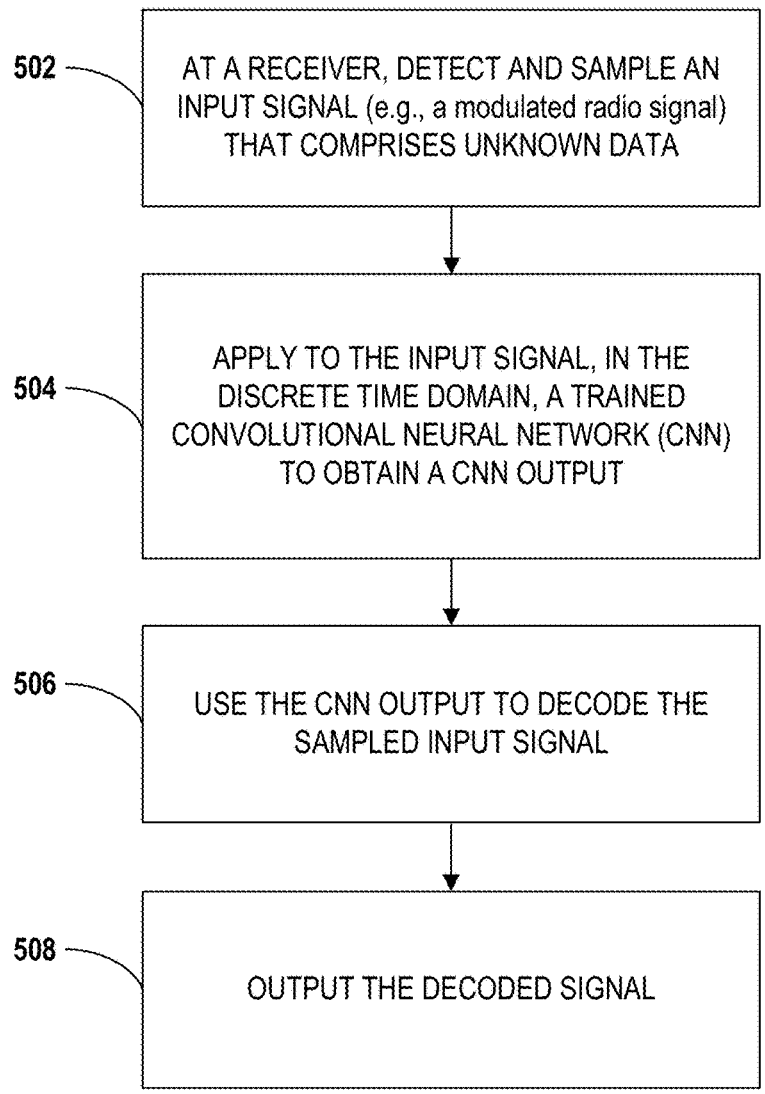
FIG. 5A is a flowchart that illustrates an exemplary process for decoding receiver signals according to embodiments of the present disclosure.

FIG. 5A is a flowchart that illustrates an exemplary process for decoding receiver signals according to embodiments of the present disclosure. In embodiments, process 500 begins at step 502 when an input signal is received at a receiver, e.g., a universal receiver that comprises a decoder. The input signal, which may be a modulated radio signal that comprises previously unknown data, may be detected and sampled using any known sampling techniques in the art.

At step 504, a CNN that comprises one or more layers with CNN kernels is applied to the sampled input signal, e.g., in the discrete time domain, in order to convolve the input signal with the CNN such as to obtain a convolved CNN output signal.

At step 506, the convolved signal may be used to decode the sampled input signal.

Finally, at step 508, the decoded signal may be output.

Figure 5B:
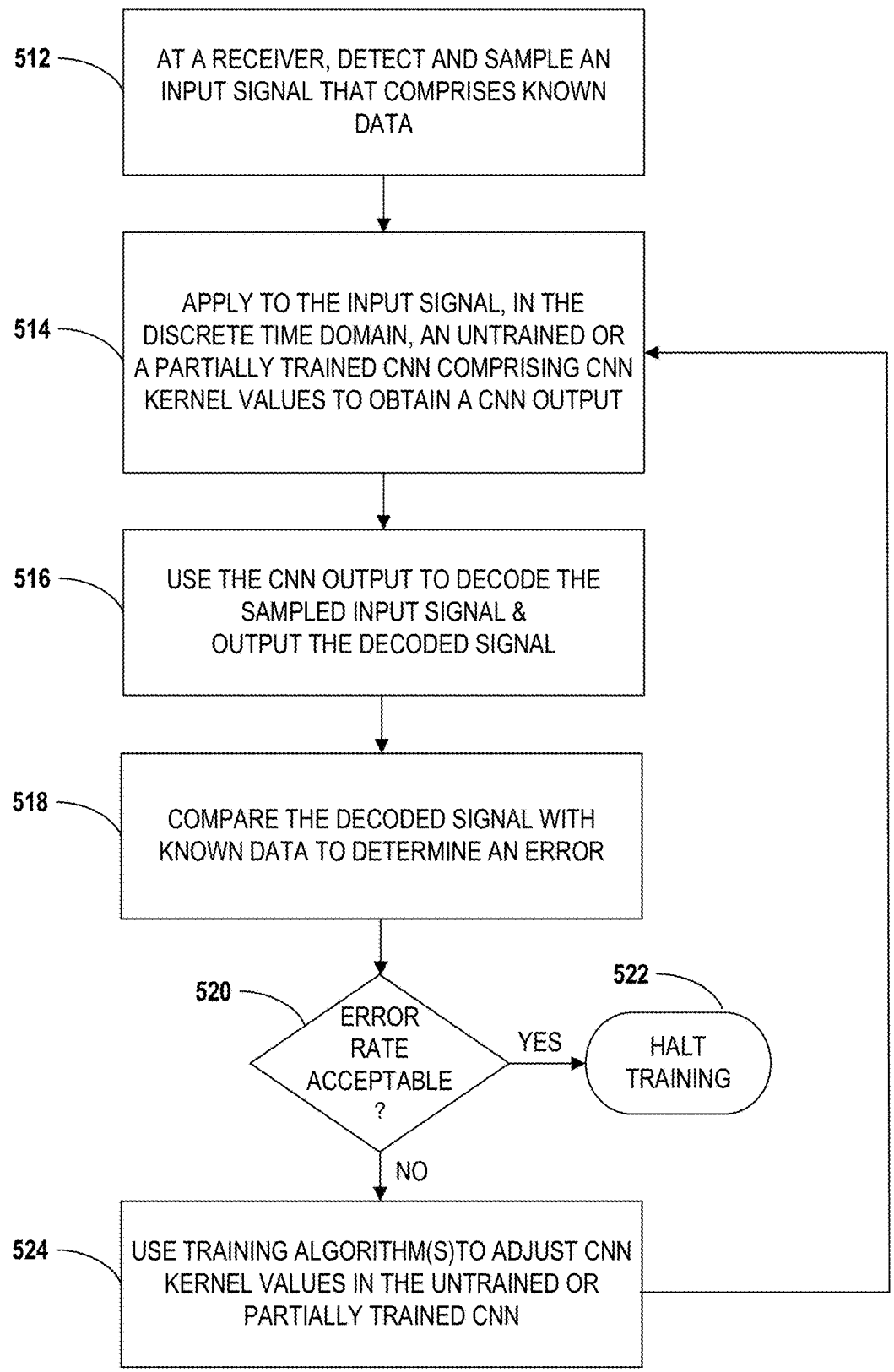
FIG. 5B is a flowchart illustrating an exemplary process for training a CNN-based demodulator/decoder system according to embodiments of the present disclosure.

FIG. 5B is a flowchart illustrating an exemplary process for training a CNN-based demodulator/decoder system according to embodiments of the present disclosure. Process 510 begins at step 512 when an input signal that comprises known, labeled data is detected at a receiver.

At step 514, an untrained or only partially trained CNN that comprises certain CNN kernels values is applied to the received input signal to convolve the input signal with the CNN kernels to obtain a convolved CNN output signal.

At step 516, the CNN output signal may be used to decode the sampled input signal that is then output.

At step 518, the decoded signal may be compared to known data to determine an error.

If, at step 520, the error meets a predetermined threshold, training is halted at step 522.

Otherwise, if the error fails to satisfy the threshold, one of one or more training algorithms may be used to adjust the CNN kernel values in the CNN, and process 510 may resume with step 514 by applying the adjusted CNN kernel(s) to the input signal to decode the input signal.

Figure 6:
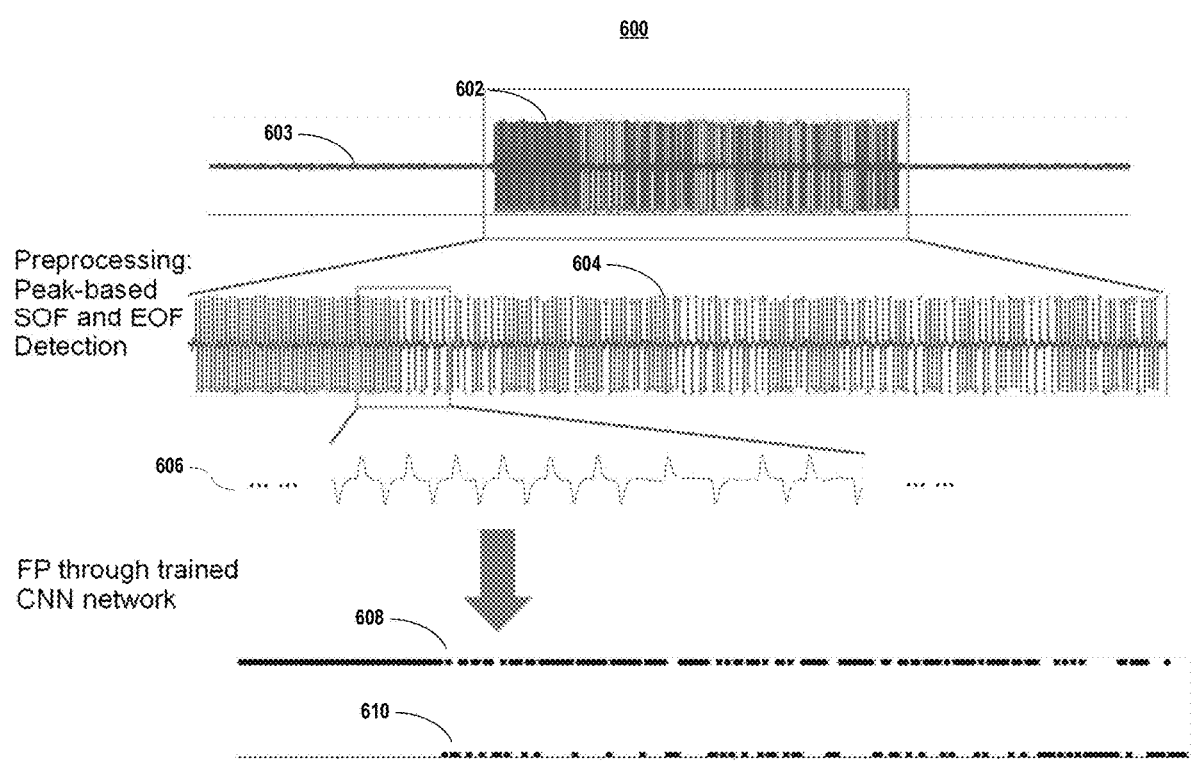
FIG. 6 illustrates preprocessing of frame detection followed by CNN-based demodulation/decoding according to embodiments of the present disclosure.

FIG. 6 illustrates preprocessing of frame detection followed by CNN-based demodulation/decoding according to embodiments of the present disclosure. In embodiments, in a preprocessing step, input signal 602 may be preprocessed to detect frame 604, e.g., the start of the frame (SOF) and the end of the frame (EOF) by any frame detection process known in the art. However, it is understood that such preprocessing step may equally be performed involving the CNN network itself.

In embodiments, frame 604, which is shown in exploded view as waveform 606, may then serve as the portion of input signal 602 that is used as the input to the CNN network and may then undergo a demodulation/decoding process according to embodiments of the present disclosure, e.g., according to FIG. 5B by undergoing forward propagation through a trained CNN to generate an output 610 that comprise zeroes and ones. It is noted that output 608 comprises a preamble of ones.

Figure 7:
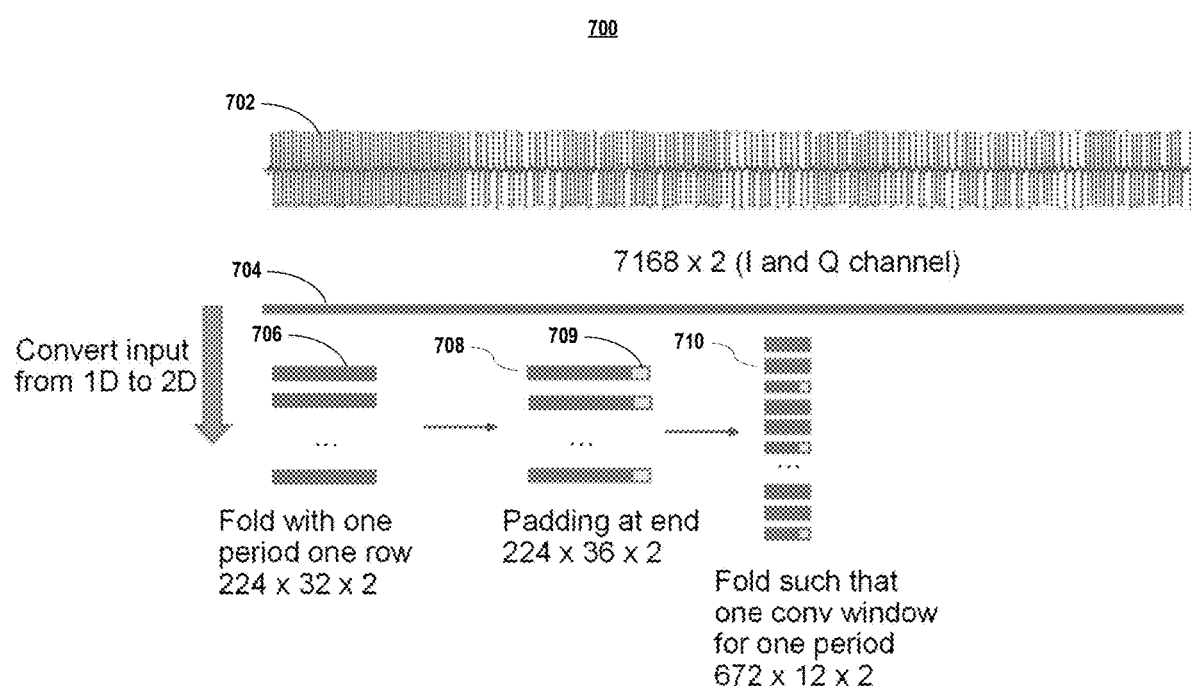
FIG. 7 and FIG. 8 illustrate demodulation/decoding for a 2D 2-layer CNN according to embodiments of the present disclosure.
Figure 8:
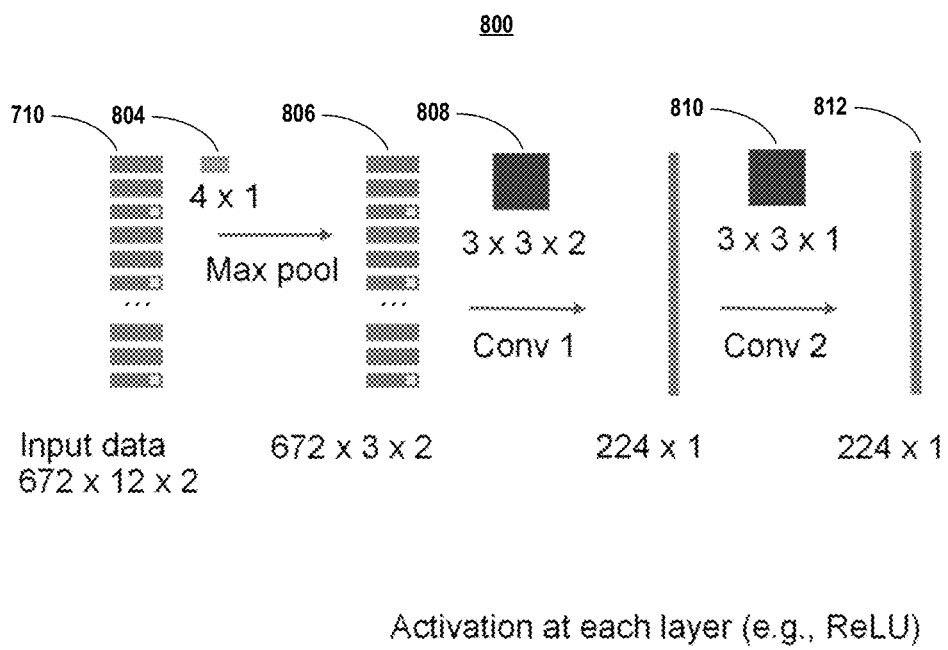

FIG. 7 and FIG. 8 illustrate demodulation/decoding for a 2D 2-layer CNN according to embodiments of the present disclosure. As shown in FIG. 7, there are 7168 sample points 704 that are used for each channel, here two radio channels, quadrature components I and Q generated by a mixer. In embodiments, sample points 704, which may be a 1D signal sequence, are converted from a 1D format to a 2D format, e.g., by the previously mentioned folding process, to obtain a multi-dimensional structure. This structure may be a matrix or stack that may be appropriately padded 708 with zeroes 709 at the end. In embodiments, prior to undergoing pooling, padded 708 structure may be again folded 710 to match the data period with convolution window size, here, a 3×3=9.

As shown in FIG. 8, max pooling may be used downsample input data 710 to a reduced size 806, here by a factor of 4, prior to applying first convolution layer 808 and second convolution layer 810. Each convolution layer may have its own activation layer.

The number of output data points in this example is 224, i.e., the process yields 224 data points with zeroes and ones.

Figure 9:
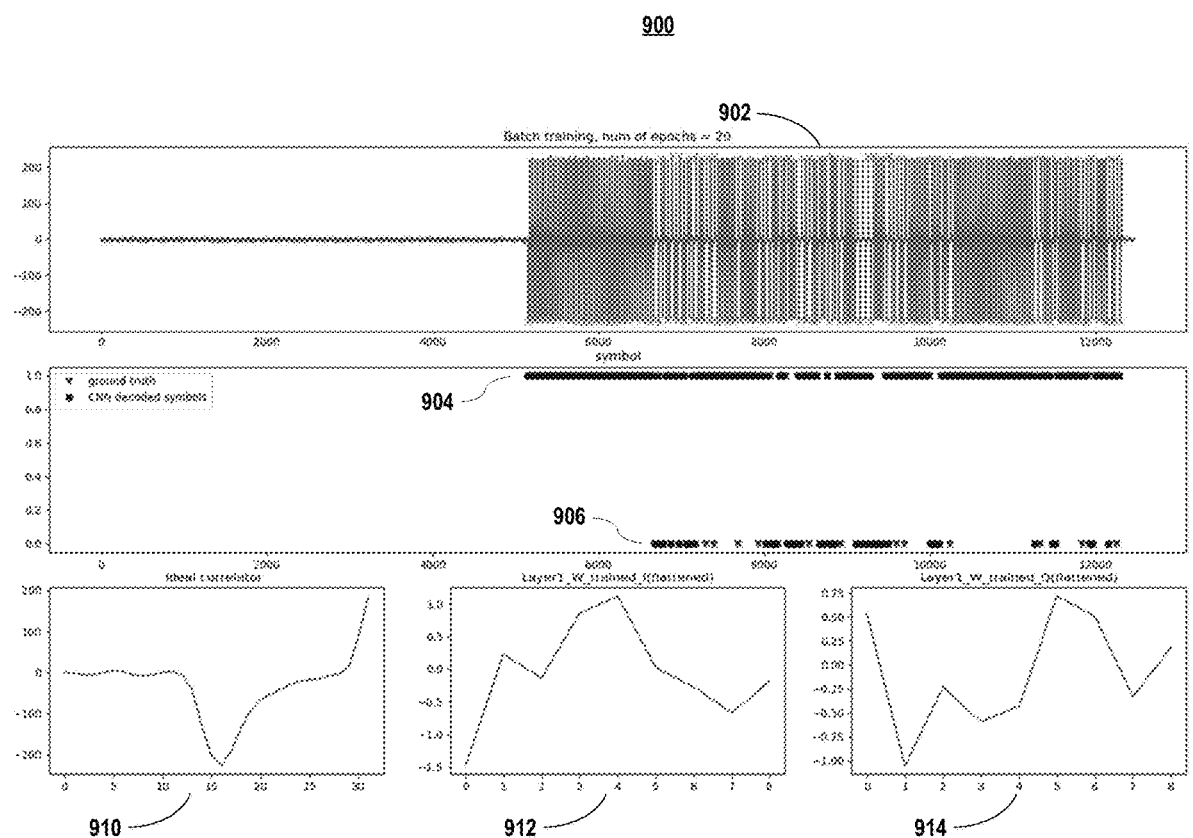
FIG. 9 shows experimental results for a batch training process for a 2D CNN for NFC Felica protocol according to embodiments of the present disclosure.
Figure 10:
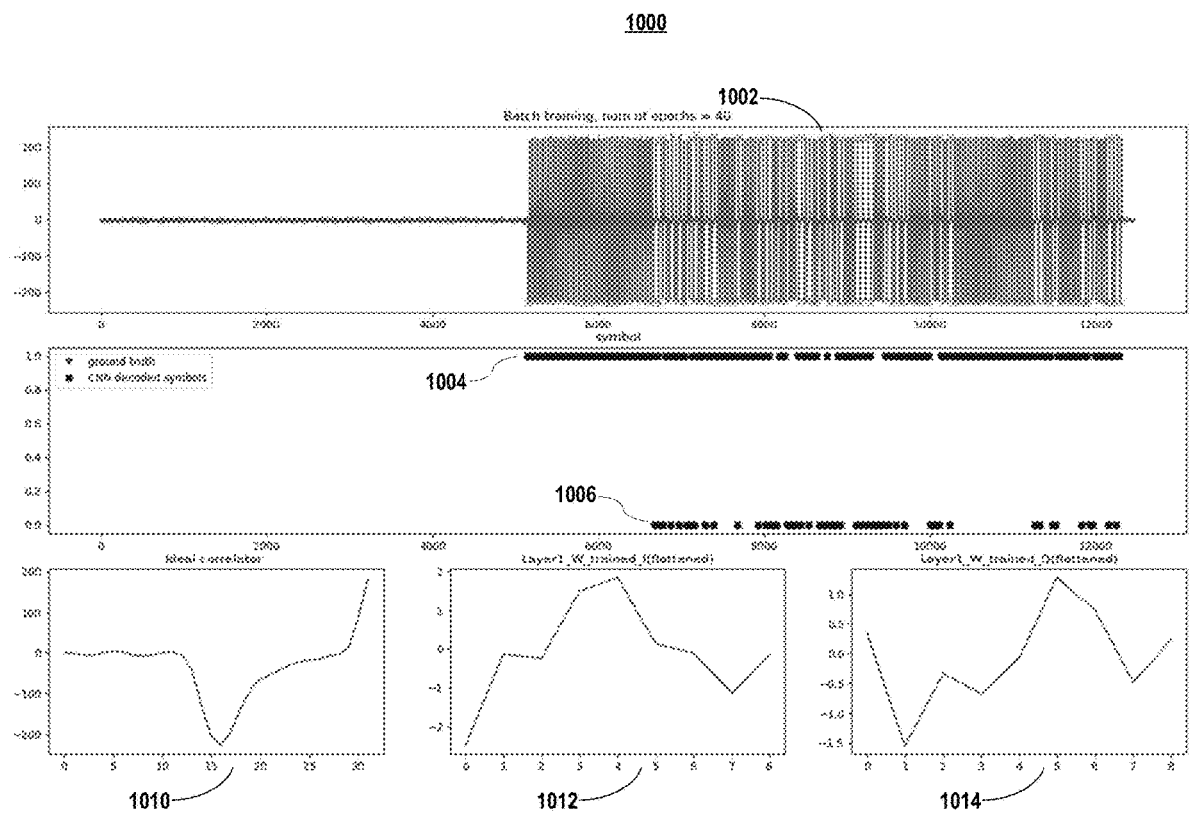
FIG. 10 shows experimental results for the batch training process in FIG. 9 after 40 epochs.

FIG. 9 and FIG. 10 show experimental results for a batch training process for a 2D CNN for NFC Felica protocol according to embodiments of the present disclosure. FIG. 9 shows experimental results for the batch training process after 20 epochs, and FIG. 10 shows results for 40 iterations. FIG. 9 shows ideal correlator 910, and intermediate training results for trained CNN kernel channels 912, 914 for layer 1 of the two layers.

Figure 11:
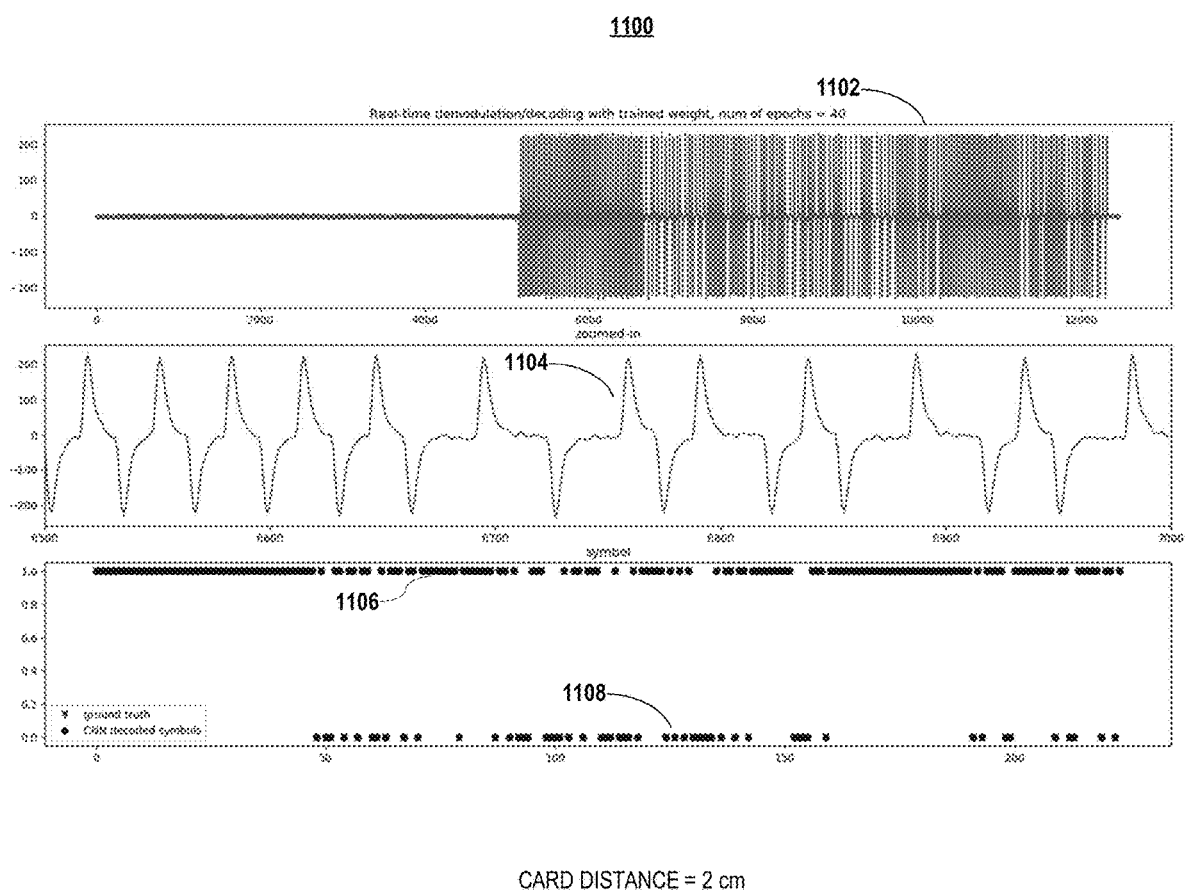
FIG. 11-FIG. 15 show near-field communication (NFC) Felica demodulation/decoding results according to embodiments of the present disclosure.
Figure 12:
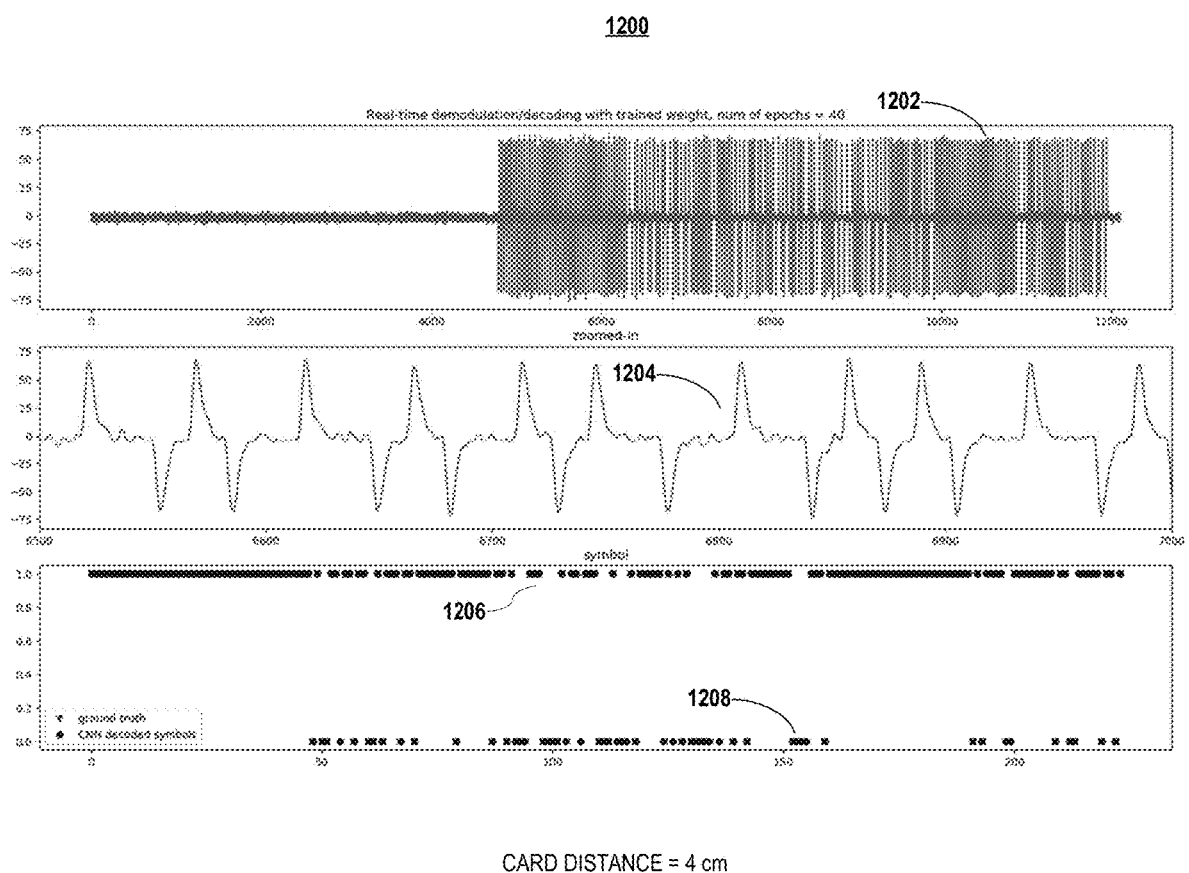
Figure 13:
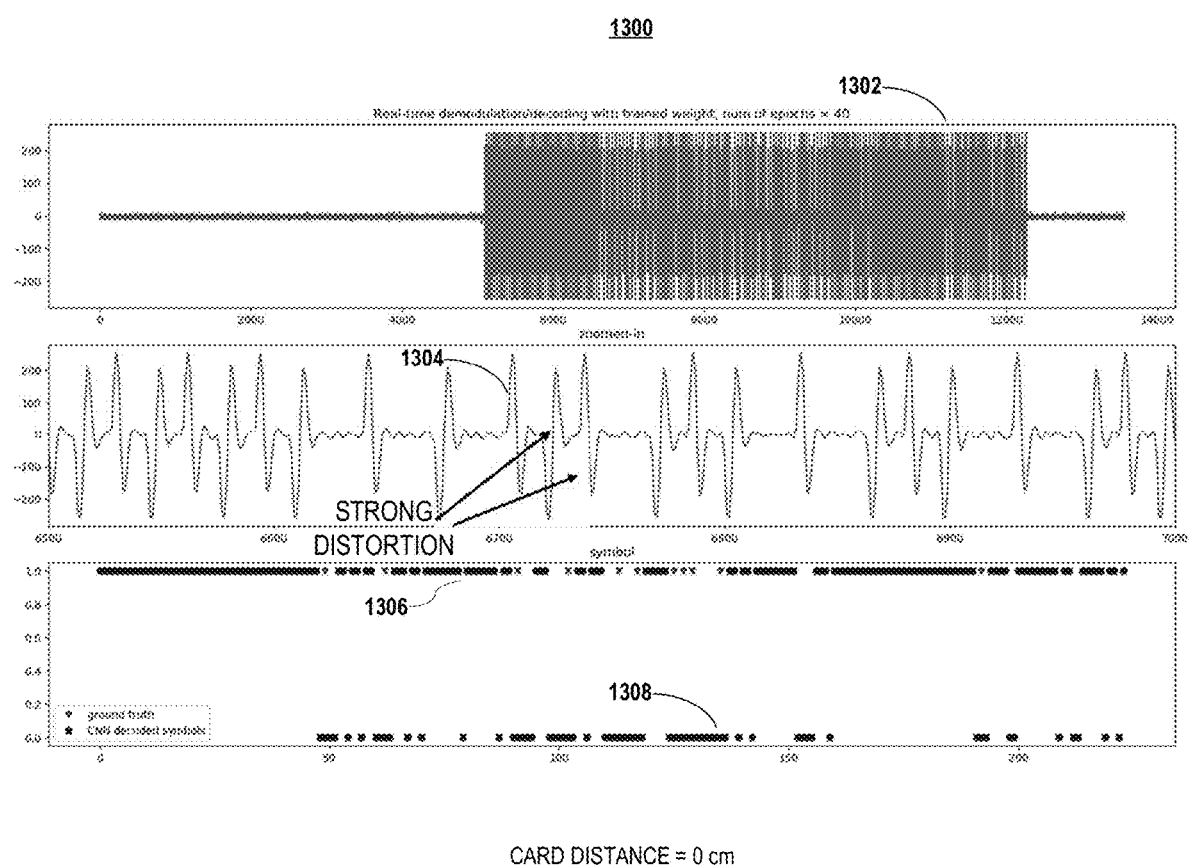

FIG. 11-FIG. 15 show NFC Felica demodulation/decoding results according to embodiments of the present disclosure. FIG. 11 shows real-time demodulation/decoding with trained weight functions. The testing card, Felica Lite®, one of the most challenging cards is read by a card reader that uses an antenna that measures 6 cm×5 cm in size. As indicated in FIG. 11, the card distance is 2 cm. Once input signal 1102 is decoded, the resulting decoded data 1108 (round symbols) is plotted against the ground truth (triangle symbols). As indicated in FIG. 11, the distance between card reader, i.e., antenna, and card is held at 2 cm. In comparison, FIG. 12 shows experimental results for a distance of 4 cm between card and card reader. As can be seen, waveforms 1204 in input signal 1202 experience some distortion indicative of reduced signal strength that is caused by the increase in distance. As shown in FIG. 13, the distortion and spurs in waveforms 1304 significantly increase when the distance is reduced to 0 cm—a condition under which existing conventional card reader hardware completely fails to perform any useful demodulation on Felica Lite® cards due to a number of factors that may include antenna resonance effects and other interface. While FIG. 13 shows some errors, this example demonstrates the advantages and the power of CNN-based demodulation/decoding according to embodiments of the present disclosure.

Figure 14:
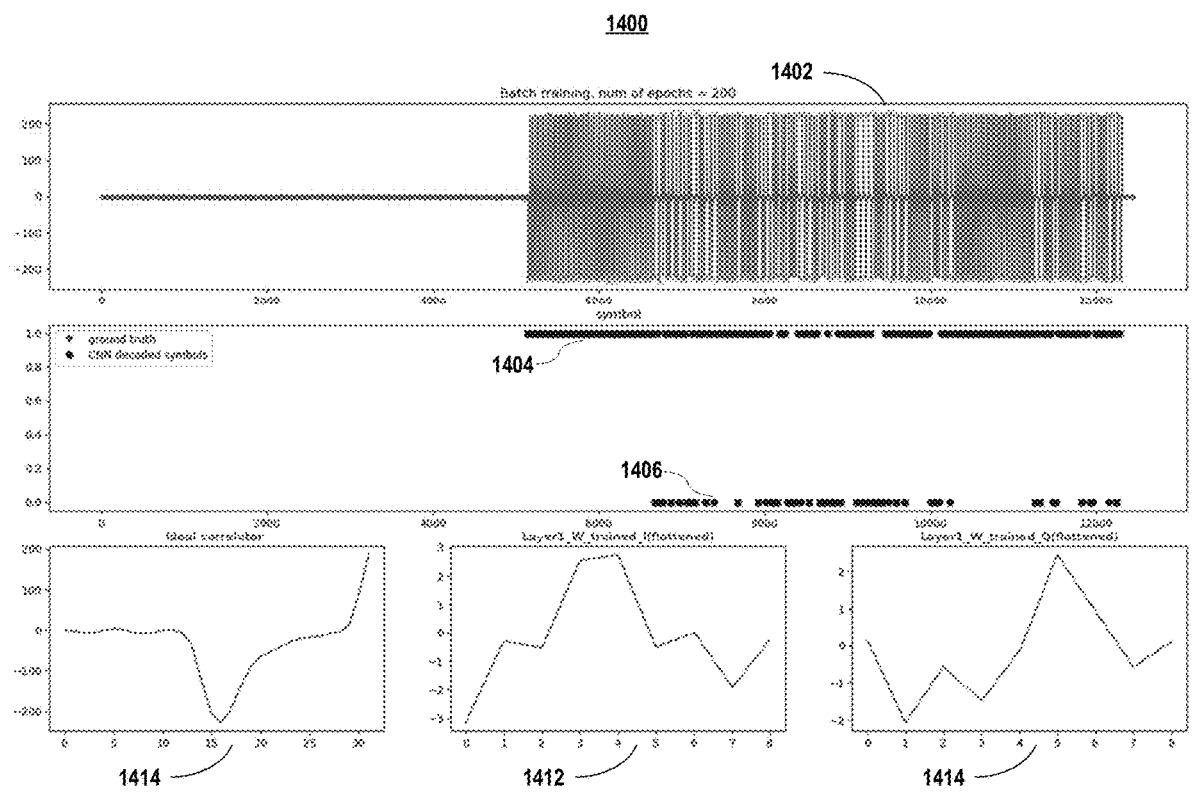

FIG. 14 illustrates trained weight functions for real-time NFC Felica® demodulation/decoding when the number of training cycles is increased to 200 epochs.

Figure 15:
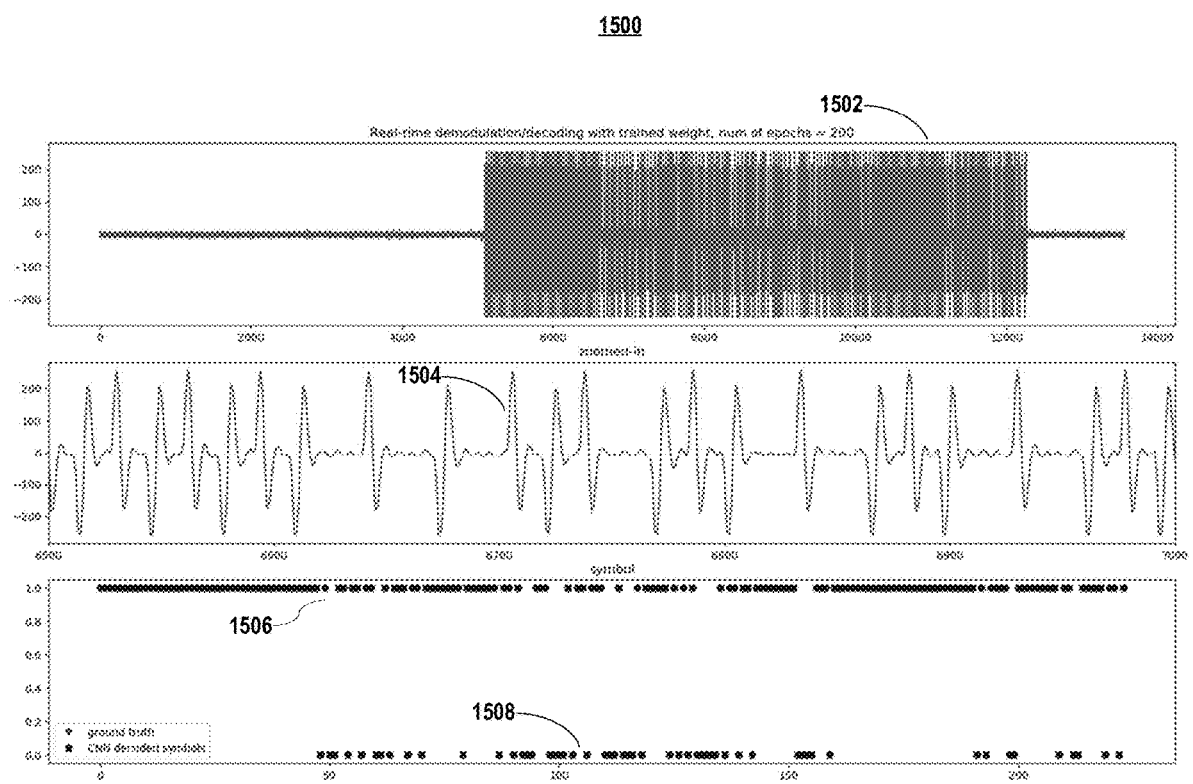

FIG. 15 shows error-free demodulation/decoding results for 0 cm-4 cm using the trained weights 1412, 1414 in FIG. 14, as well as the trained weights in the second layer. As FIG. 15 demonstrates, training enables full demodulation/decoding for even for the most challenging card distances.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 16:
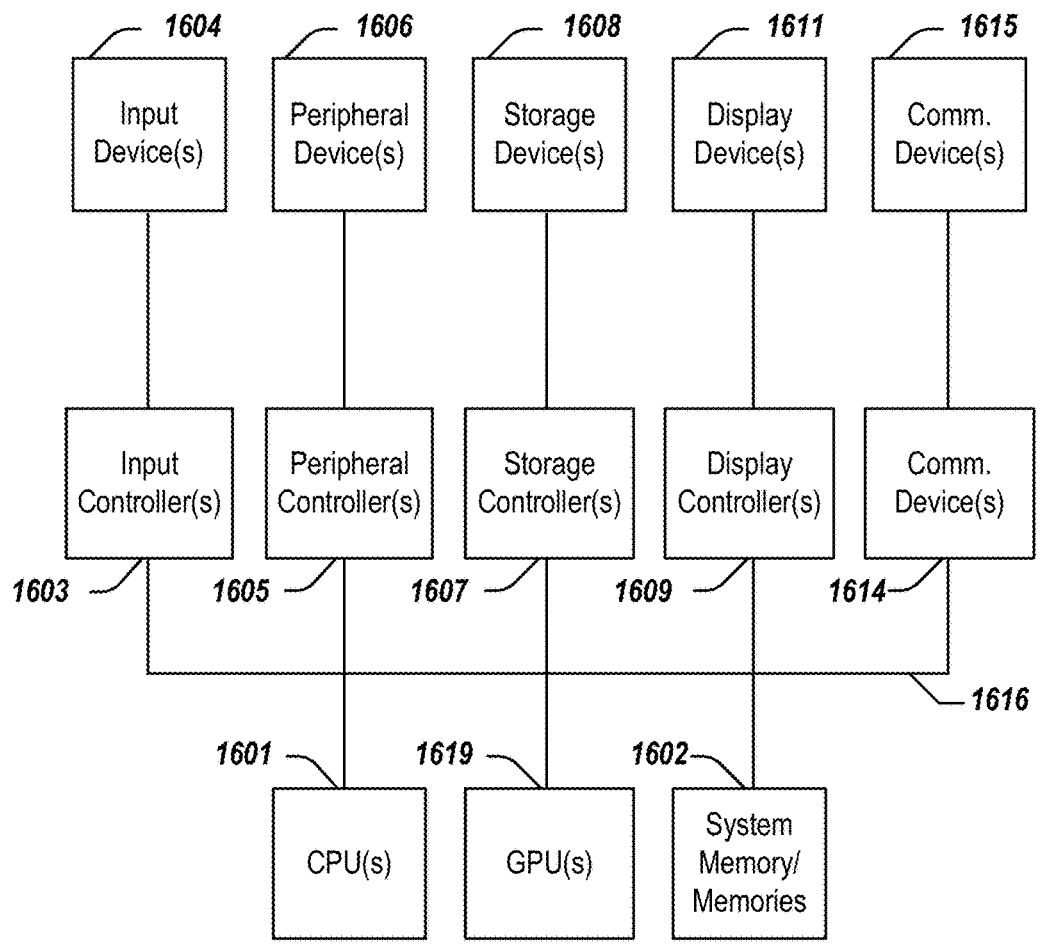
FIG. 16 depicts a simplified block diagram of an information handling system according to embodiments of the present invention.

FIG. 16 depicts a simplified block diagram of an information handling system (or computing system) according to embodiments of the present disclosure. It will be understood that the functionalities shown for system 1600 may operate to support various embodiments of a computing system—although it shall be understood that a computing system may be differently configured and include different components, including having fewer or more components as depicted in FIG. 16.

As illustrated in FIG. 16, the computing system 1600 includes one or more central processing units (CPU) 1601 that provides computing resources and controls the computer. CPU 1601 may be implemented with a microprocessor or the like, and may also include one or more graphics processing units (GPU) 1619 and/or a floating-point coprocessor for mathematical computations. System 1600 may also include a system memory 1602, which may be in the form of random-access memory (RAM), read-only memory (ROM), or both.

A number of controllers and peripheral devices may also be provided, as shown in FIG. 16. An input controller 1603 represents an interface to various input device(s) 1604, such as a keyboard, mouse, touchscreen, and/or stylus. The computing system 1600 may also include a storage controller 1607 for interfacing with one or more storage devices 1608 each of which includes a storage medium such as magnetic tape or disk, or an optical medium that might be used to record programs of instructions for operating systems, utilities, and applications, which may include embodiments of programs that implement various aspects of the present disclosure. Storage device(s) 1608 may also be used to store processed data or data to be processed in accordance with the disclosure. The system 1600 may also include a display controller 1609 for providing an interface to a display device 1611, which may be a cathode ray tube (CRT), a thin film transistor (TFT) display, organic light-emitting diode, electroluminescent panel, plasma panel, or other type of display. The computing system 1600 may also include one or more peripheral controllers or interfaces 1605 for one or more peripherals 1606. Examples of peripherals may include one or more printers, scanners, input devices, output devices, sensors, and the like. A communications controller 1614 may interface with one or more communication devices 1615, which enables the system 1600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A decoding method for a universal receiver, the decoding method comprising:
    receiving, at a convolutional neural network (CNN) correlator implemented in a decoder, an input signal that comprises input data unknown to the CNN correlator;
    applying to the input signal, in a discrete time domain, a convolution to obtain a CNN correlator output;
    applying the CNN correlator output to an activation to decode the input signal; and
    outputting the decoded signal.

2. The decoding method according to claim 1, wherein the convolution is a one-dimensional convolution and the input signal is a one-dimensional data sequence.

3. The decoding method according to claim 1, further comprising converting the input signal into a multi-dimensional data format that matches size and shape of a multi-dimensional kernel, and providing the input data into the CNN correlator, the CNN correlator being a multi-dimensional CNN.

4. The decoding method according to claim 1, wherein the CNN correlator output comprises at least one of an output feature sequence or an output feature map, the output feature sequence or the output feature map comprising feature points that each represent a weighted sum of the input data.

5. The decoding method according to claim 4, further comprising applying to one or more of the weighted sums a trainable bias.

6. The decoding method according to claim 1, wherein obtaining the CNN correlator output comprises detecting within the input signal a pattern.

7. The decoding method according to claim 6, wherein the pattern comprises a discrete time domain sequence of finite-length.

8. The decoding method according to claim 6, wherein detecting the pattern comprises detecting a correlation between bits in the input signal and a kernel of the CNN, the correlation corresponding to the CNN correlator output.

9. The decoding method according to claim 8, wherein the kernel comprises a number of channels that equals a number of channels of the input signal.

10. The decoding method according to claim 1, further comprising applying padding to the input data to cause the CNN correlator output to have a predetermined sequence size.

11. The decoding method according to claim 1, further comprising testing the decoded signal in real-time to determine whether at least a one or a zero has been recognized.

12. A decoder system for a universal receiver, the decoder system comprising:
a decoder;
a convolutional neural network (CNN) correlator coupled to the decoder, the decoder receives an input signal that comprises input data unknown to the CNN correlator; and
a CNN coupled to the CNN correlator, the CNN convolves, in a discrete time domain, the input signal with a kernel to generate a CNN correlator output, the CNN correlator applies the CNN correlator output to a non-linear activation to detect and output a signal of interest in the input signal.

13. The decoder system according to claim 12, further comprising a programmable low-power accelerator that executes the kernel.

14. The decoder system according to claim 12, further comprising a hardware accelerator that, in the analog domain, executes the non-linear activation.

15. The decoder system according to claim 12, wherein the CNN has been trained by a supervised model to adjust kernel values in the CNN.

16. The decoder system according to claim 15, wherein the kernel values are programmable.

17. The decoder system according to claim 12, wherein the CNN, in response to receiving a training sequence, uses the training sequence as a labeled training data set.

18. The decoder system according to claim 17, wherein the training sequence is a preamble that comprises a pattern of signals that represent zeroes and ones.

19. The decoder system according to claim 12, wherein the CNN correlator output comprises at least one of an output feature sequence or an output feature map, the output feature sequence or the output feature map comprising feature points that each represent a weighted sum of the input data.

20. The decoder system according to claim 12, wherein obtaining the CNN correlator output comprises detecting within the input signal a pattern that comprises detecting a correlation between bits in the input signal and the kernel, the correlation corresponding to the CNN correlator output.

* * * * *